(No Model.) 4 Sheets—Sheet 3.

C. F. CATTELL.
GAS GENERATOR.

No. 459,925. Patented Sept. 22, 1891.

WITNESSES:

INVENTOR
Charles F. Cattell
per Joshua Pusey
atty (No Model.) 4 Sheets—Sheet 4.
C. F. CATTELL.
GAS GENERATOR.
No. 459,925. Patented Sept. 22, 1891.
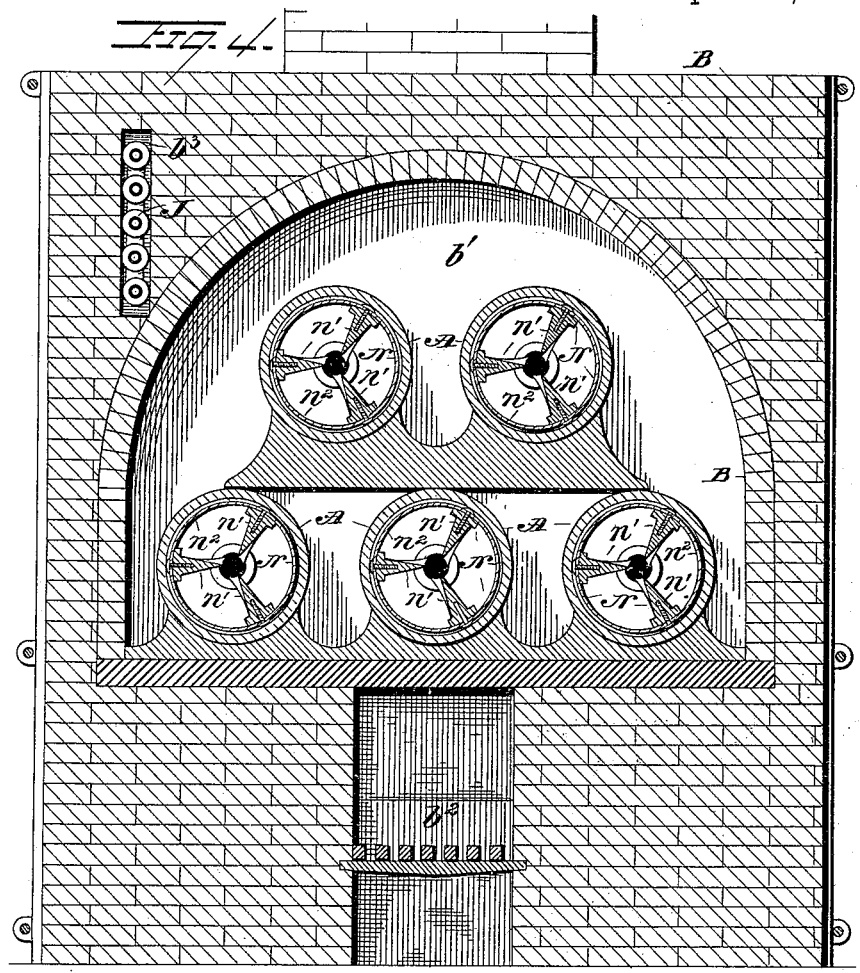
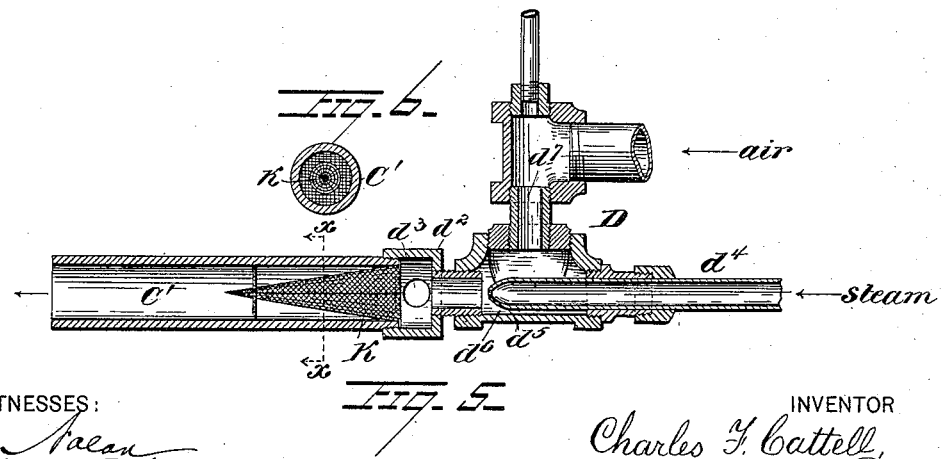
WITNESSES:
INVENTOR
Charles F. Cattell,
per Joshua Pusey
atty.

UNITED STATES PATENT OFFICE.

CHARLES F. CATTELL, OF DARBY, PENNSYLVANIA.

GAS-GENERATOR.

SPECIFICATION forming part of Letters Patent No. 459,925, dated September 22, 1891.

Application filed October 11, 1887. Serial No. 251,991. (No model.)

*To all whom it may concern:*

Figure 1:
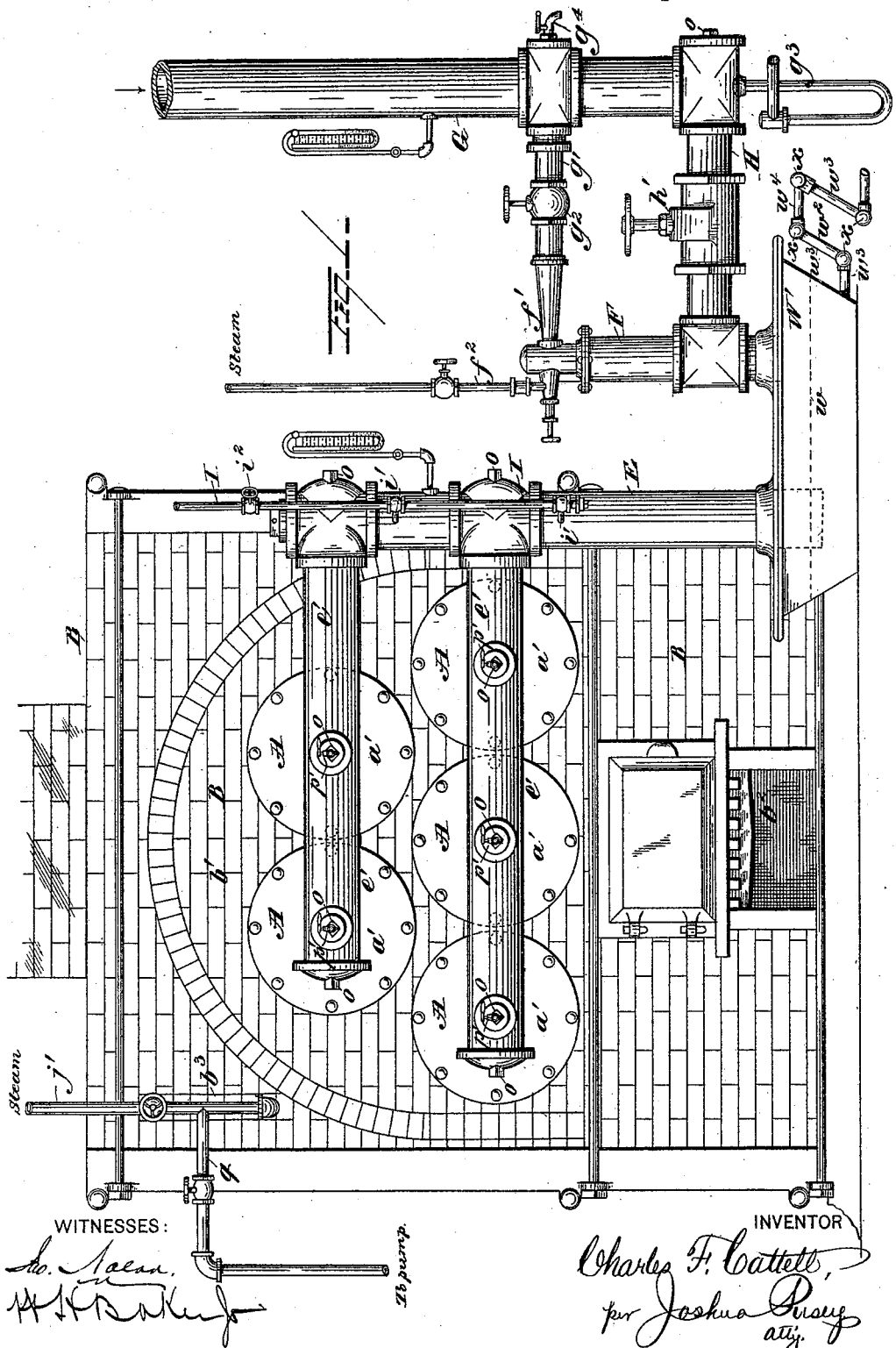
Figure 2:
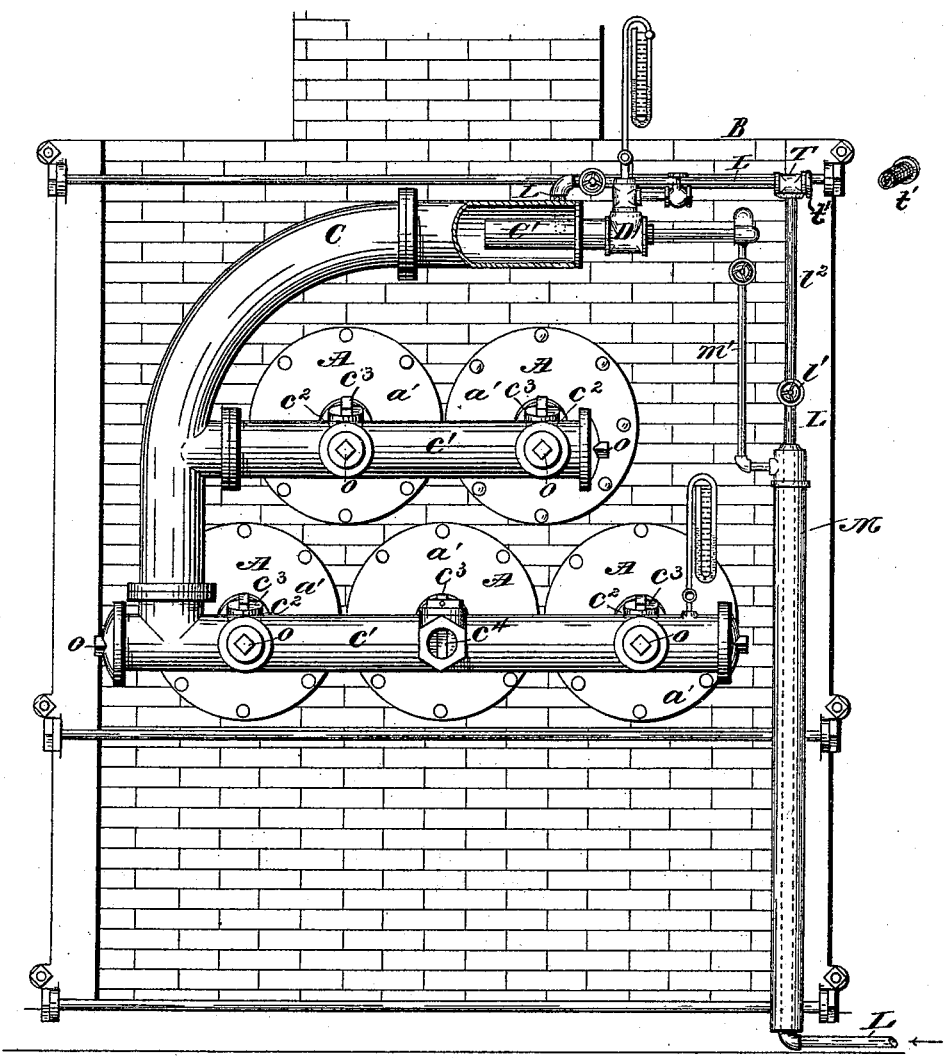
Figure 3:
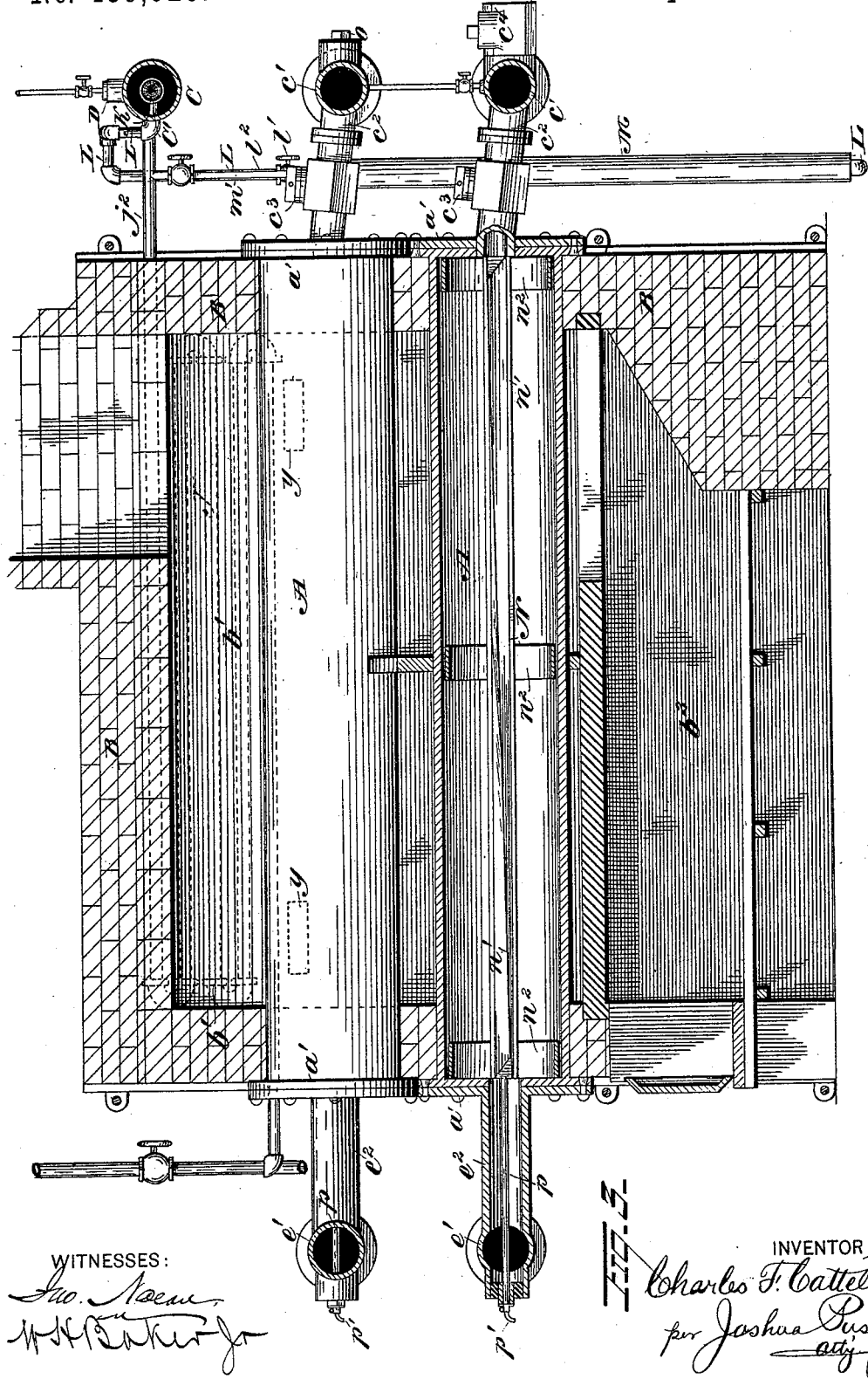

Be it known that I, CHARLES F. CATTELL, a citizen of the United States, residing at Darby, in the county of Delaware and State of Pennsylvania, have invented certain new and useful Improvements in Gas-Generators, of which the following is a full, clear, and exact description, reference being had to the accompanying drawings, of which—
Figure 1, Sheet 1, is a front view of the apparatus. Fig. 2, Sheet 2, is a rear view thereof, the parts visible in the front being omitted. Fig. 3, Sheet 3, is a longitudinal vertical section. Fig. 4, Sheet 4, is a transverse vertical section. Fig. 5 is a longitudinal vertical section of the injector and vaporizer. Fig. 6 is a section on line $x\,x$, Fig. 5.

This invention relates to that well-known class of devices for generating gases for heating and lighting purposes wherein jets of atmospheric air and steam are intermingled with hydrocarbon—such as petroleum—in order to vaporize and evolve the gases therefrom, the vaporized gases so produced being conveyed to suitable retorts and subjected to intense heat for the purpose of fixing and curing said gases.

The main object of the invention is to improve the construction of such apparatus in various particulars, as hereinafter set forth, whereby a uniform and superior quality of gas will be quickly generated and the clogging of the retorts and adjuncts from carbon and like deposits will be materially lessened.
The invention consists, primarily, in the combination, with the retorts, the retort-containing chamber, and the furnace, of a vaporizing-chamber wherein the hydrocarbon is vaporized and gases evolved therefrom, an injector for injecting steam and air into said chamber for the purpose of effecting such evaporization and evolution of gases, and a series of feed-pipes connecting said vaporizing-chamber with the several retorts, each of the said pipes being provided with stop-cocks, whereby the vaporized gases generated in said latter chamber may be shut off (more or less) from the respective retorts in order to regulate the flow thereto of the vaporized hydrocarbons or gases, as hereinafter explained.

The invention consists, also, in the combination, with the devices above referred to, of an air-valve connected to a pipe uniting said feed-pipes and the vaporizing-chamber, whereby air or air and steam may be admitted to the retorts and the pipes in order to remove the carbon or like deposits which may accumulate in the apparatus during the operation thereof.

The invention consists, also, in the combination, with the retorts, the retort-heating chamber, and an injector connected with said latter chamber, of a screen or sieve so disposed with relation to said injector and vaporizing-chamber that the hydrocarbon will be broken up into particles and dissipated and the steam and air be intimately mingled therewith.

The invention consists, also, in the combination, with the retorts, retort-heating chamber, and adjuncts, of longitudinal ribs or projections in the interior of said retorts, whereby not only is a large heating-surface presented to the vaporized gases during the process of fixing or curing the same, but said gases are deflected against the sides of the retorts, and thereby more effectually fixed.

The invention consists, also, in the combination, with a gas-generating apparatus wherein gas is evolved from hydrocarbon by intermingling steam and air therewith, of a steam-jacket surrounding the hydrocarbon feed-pipe in order to heat said hydrocarbon on its way to the vaporizing-chamber, and thus render the hydrocarbon more susceptible to the action of the air and steam.

The invention consists, also, in the combination, with a gas-generating apparatus of the class recited, of a washer adjacent thereto, a pipe whereby the fixed gas is conveyed to said washer, an outlet-pipe, and a steam-jet or other exhauster connecting said washer and outlet-pipe and adapted to draw the cleansed gas from said washer.

The invention consists, also, in certain details of construction which will be hereinafter fully described and duly claimed.

Referring now to the annexed drawings, A marks the series of cylindrical retorts, which are contained within the arched chamber $b'$, located above the furnace $b^2$, which furnace and chamber are built of brick-work B in the usual manner. On the rear exterior of the brick structure is a curved pipe C, from which extend lateral pipes $c'$, which are connected with the retorts A by means of feed-pipes $c^2$. Each of these pipes $c^2$ is provided with a stop-cock $c^3$ or other suitable regulating device, for a purpose hereinafter described. Either of said pipes $c'$ is provided with a valve $c^4$, whose function will be hereinafter explained. Extending into the upper end of the pipe C is a cylinder C′, hereinafter termed the "vaporizer," which has secured thereto a steam and air injector D of usual construction. On the forward end of the structure, near one edge thereof, is disposed a vertical pipe E, which extends down into the water $w$, contained within a sealed tank W′. Leading to this pipe are two horizontal pipes $e'$, which are connected with the retorts by means of pipes $e^2$, extending from each of said retorts. Adjacent to the pipe E is a pide F, which extends vertically from the washer W′, and which pipe F is provided at its upper end with a steam-jet exhauster $f'$ of ordinary construction, which is fed by a steam-pipe $f^2$. This exhauster $f'$ is connected with the stand or outlet pipe G by means of a horizontal pipe $g'$, that is provided with a suitable valve $g^2$. Just above the tank W′ is another pipe H, which also connects the pipes F and G. This pipe H is provided with a suitable valve $h'$.

Near the pipe E is a small water-pipe I, which is provided with one or more branch or spray pipes $i'$, that extend into said pipe E. This pipe I has a suitable stop-valve $i^2$.

On one side of the retort-heating chamber $b'$ (communicating therewith by openings $y$, Fig. 3) is a longitudinal chamber $b^3$, which contains a circulating-pipe system J, connected by means of pipe $j'$ to an adjacent steam-boiler and by a pipe $j^2$ to the injector D. Within the vaporizer C′, to which said injector is secured, as above stated, there is disposed a screen K, preferably conical, and immediately in front of the latter in the union $d^2$ is an orifice $d^3$, (see Fig. 5,) through which extends the hydrocarbon feed-pipe L.

The above is a general description of the apparatus. Its operation is briefly described as follows: Petroleum or other suitable hydrocarbon passes into the vaporizer C′ by way of the pipe L. Superheated steam and atmospheric air are brought into contact with the liquid, which vaporize the latter and evolve the confined gases therefrom. Said steam, which is superheated in the pipes J, is conveyed to the latter from an adjacent boiler by means of the pipe $j'$, and when superheated is carried by way of pipe $j^2$ to the tube $d^4$ within the injector D. The end of this tube is contracted, and a small orifice $d^5$ is thus formed therein, through which a jet of steam passes. The jet in its course forces the air from the space $d^6$ and tends to form a vacuum therein, which draws in currents of air through the pipe $d^7$, which air, in conjunction with the steam, coming into contact with the hydrocarbon, intermingles with and vaporizes the latter, thus evolving the gases therefrom. The screen K, which is disposed at the mouth of the vaporizer C′, as shown, breaks up the particles of oil and thoroughly blends the elements together. In order to heat the oil on its passage to the vaporizer C′ and thereby render the confined gases more susceptible to the action of the air and steam, I surround a portion of the pipe L with a steam-jacket M, which is fed from a small pipe $m'$, connected with the steam-pipe $j^2$. The vaporized gases generated in the vaporizer C′ pass by way of the pipes C $c'$ and feed-pipes $c^2$ to the retorts A, wherein they are converted into a perfectly-fixed gas by coming into contact with the heated surfaces of the retorts.

In order to present a large heating-surface to the gas within the retorts and also to deflect said gas against the sides of the retorts, and thereby increase the fixing capacity of the latter and more effectually fix the gas therein, I provide the interior of each retort with a core-frame N, consisting, preferably, of a series of twisted longitudinal ribs or wings $n'$, secured to bands or collars $n^2$, as seen in Figs. 3 and 4. This frame may remain stationary within the retorts or be given a rotary motion by means of suitable mechanism, if desired. The fixed gas passes through the pipes $e^2$ on the front or opposite end of the retorts to the horizontal pipes $e'$ and thence to the pipe E and to the washer W′, said gas being cooled on its way to the latter by sprays of water from the pipes $i'$, which prevent the formation of pitch, &c., within said pipe E and consequent clogging thereof and stopping of the apparatus. The gas bubbles up to the top of the water $w$ and is drawn by the steam-jet exhauster $f'$ to the pipe $g'$ and forced therefrom to the stand-pipe G, from whence it is carried to a suitable main for further washing, or it may be conveyed from said pipe G for immediate use for heating and illuminating purposes. When there is not sufficient steam to feed the exhauster $f'$, the valve $g^2$ on the pipe $g'$ is closed and the valve $h'$ on the lower pipe or by-pass H is opened, whereupon the gas passes through said pipe H to and up the stand-pipe G. The latter is provided at its lower end with a siphon $g^3$ in order to allow to escape any tar, water, or other liquid matter which may be formed in said pipe. The tank W′ is also provided with a siphon $w^2$ for permitting the escape of the water $w$ when desired. The limbs $w^3$ of this siphon are jointed at $x$ in order to raise or lower the horizontal tube $w^4$ or water-line to allow the discharge of the water from the tank under different circumstances. By means of the cocks $c^3$ in the feed-pipes $c^2$ the volume of vapor allowed to enter each retort may be nicely regulated—that is to say, if one retort consume or fix more gas than another the valve of the latter may be sufficiently opened or that of the other correspondingly closed in order that the volume of vapor fed to the retorts will be proportionate to the fixing capacity thereof.

Large deposits of carbon accumulate from time to time in the retorts of this class of apparatus and seriously affect the fixing of the gas therein. Heretofore in order to remove these deposits it has been necessary to remove the heads $a'$ of the retorts and scrape away the hard carbon, which scraping greatly injures the retorts. In order to obviate this defect, I provide the pipe $c'$ with a cock $c^4$, through which when the apparatus is not in operation I allow air or air and steam to pass, which wholly removes any carbon which may have been formed in the retorts or pipe connections. To effectually draw the air or air and steam through the retorts and pipe connections I open all the valves connecting said pipes and retorts, discharge the water from the tank $W'$, and open a cock $g^4$, which I provide on the stand-pipe G opposite to pipe $g'$, whereupon the exhauster draws in the air, &c., through the valve $c^4$, which air, &c., after passing through all the retorts and pipe connections, escapes from the apparatus through the cock $g^4$.

All the pipes are provided with end plugs $o$ in order to facilitate the inspection and cleaning of the pipes.

As a ready means to test the quality of gas generated in the several retorts I extend through the plugs $o$, which communicate with the pipes $e^2$, small pipes $p$, leading to the interior of the retorts. Each pipe is provided at its forward end with a small petcock $p'$, through which when opened a jet of gas passes from the retort.

Instead of conveying steam from the boiler to the superheating-pipes J, I sometimes connect to the latter a pipe $q$, through which drops of water are pumped to the pipes by a suitable force-pump. (Not shown.) When the pump is used, I close the valve of pipe $j'$.

In order to strain the oil on its way to the vaporizer, I also provide the pipe L at some suitable point with a T, into which fits a small open-wire straining-thimble $t'$. By closing the valve $l'$ on this pipe L the thimble may be removed and the lower section $l^2$ of said pipe be cleaned without stopping the apparatus.

Having thus described my invention, I claim as new and wish to secure by Letters Patent—

1. In an apparatus of the class recited for generating gas for heating and lighting purposes, the combination, with the retorts, the retort-containing chamber, and the furnace, of a vaporizing-chamber wherein the hydrocarbon is vaporized and gases evolved therefrom, an injector for injecting steam and air into said chamber for effecting this result, and a series of feed-pipes connecting said vaporizing-chamber with each of the several retorts, each of the said pipes being provided with regulating-cocks, whereby the vaporized gases generated in the said latter chamber may be shut off (more or less) from the respective retorts in order to regulate the flow thereto of the vaporized gases, substantially as and for the purpose set forth.

2. In a gas-generator of the class recited, the combination, with the retorts, the retort-containing chamber, and the furnace, of the vaporizer, the steam and air injector, the hydrocarbon-feed pipe, the series of pipes extending from the retorts, the common pipe connecting said pipes with the vaporizer, and the valve connected to said common pipe for the purpose of admitting air or air and steam to said retorts, substantially as and for the purpose set forth.

In testimony whereof I have hereunto affixed my signature this 24th day of September, A. D. 1887.

CHARLES F. CATTELL.

Witnesses:
 JAMES P. PETIT,
 JNO. NOLAN.